(Model.)
W. L. LIBBEY.
Mold and Process for the Manufacture of Glassware.
No. 234,300. Patented Nov. 9, 1880.
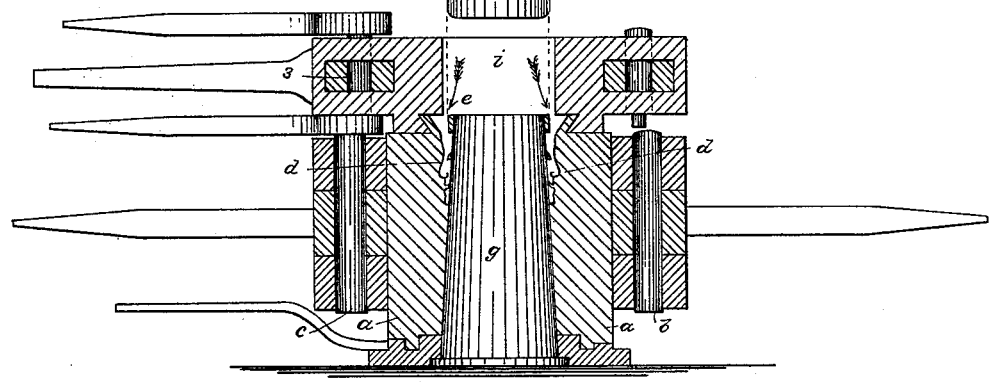
Fig:1.
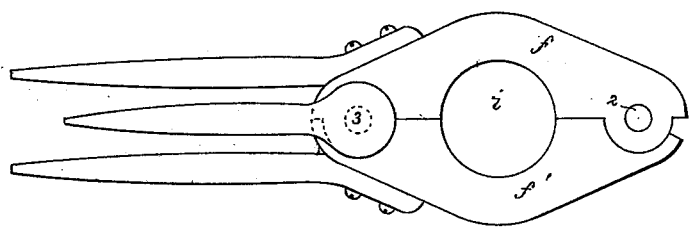
Fig:2.
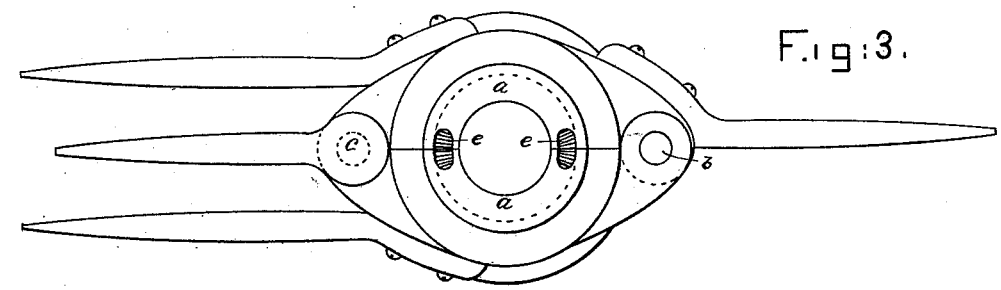
Fig:3.
Witnesses
V. D. Dearborn.
L. F. Connor.
Inventor-
William L. Libbey
by Crosby & Gregory Attys

United States Patent Office.

WILLIAM L. LIBBEY, OF BOSTON, MASSACHUSETTS.

MOLD AND PROCESS FOR THE MANUFACTURE OF GLASSWARE.

SPECIFICATION forming part of Letters Patent No. 234,300, dated November 9, 1880.

Application filed March 15, 1880. (Model.)

*To all whom it may concern:*

Be it known that I, WILLIAM L. LIBBEY, of Boston, county of Suffolk, State of Massachusetts, have invented an Improvement in Molds and Processes for the Manufacture of Glassware, of which the following description, in connection with the accompanying drawings, is a specification.

This invention relates to the manufacture of articles of glassware, and has for its object the formation upon an article of glass of figures or ornamental designs in glass of the same or different color or material, my aim being to reproduce glassware having the general appearance and character of the well-known Portland vase.

In this my invention I form, at the under side of the mold, an intaglio representing the figures or designs it is desired to produce in relief upon the article of glass, a core being employed, which is withdrawn when the body of the vase is subsequently blown or shaped in the mold in contact with the ornamental glass figures or designs then in the intaglio.

Figure 1 represents, in vertical section, a glass mold with plunger above it; Fig. 2, a top view of the mold-font; Fig. 3, a top view of the mold with the font removed.

The mold $a$, of metal, in two parts, is pivoted at $b$, and held closed by the pin $c$, all as common.

Within the mold, in intaglio, is cut or formed a fac-simile of the figure or design, $d$, it is designed shall appear upon the outside of the glass article to be made in the mold. The openings $e\ e$ lead into the intaglio recesses $d$. The font is composed of the two jaws $f f'$, pivoted together at 2, and fastened by pin 3. The core $g$ fills the mold snugly. The plunger $h$ is connected with and operated by the press in any usual way.

With the parts in the position Fig. 1 molten glass of the desired character, quality, and color or colors is placed in the hot font-space $i$, and the plunger $h$ is caused to descend, forcing the glass in the font through the passages $e$, into the intaglio recesses $d$ in the hot metallic mold. This done, the plunger is raised, the font is opened and removed from the end of the mold, the core $g$ is removed from the mold, and, preferably while the mold is inverted, a ball of glass on the usual blowing-rod is placed within the cavity of the mold, and is blown so as to fit the interior of the mold and form an article of glass shaped externally in accordance with the interior of the mold, the said article adhering firmly to the glass ornament yet in the intaglio and kept hot. Instead of blowing the article of glass to fit the interior of the mold, I may mold the said article in any usual way. The mold is opened to permit the removal from it of the article so finished.

By this my invention and method it is possible to produce articles of glass smooth at their interior and ornamented in relief with any suitable or desired figures or designs, the said figures or ornaments being of the same or different colors of glass. Glass of different color or kind may be placed in both the intaglio figures $d$.

I am aware that it has been proposed to place colored beads or glasses or pieces of metal in recesses in a plate, and then heat the plate and the material in it, after which the heated glass article being formed is laid upon them, so that the pieces forming the pattern adhere to the article.

I claim—

1. The two-part mold cut in intaglio in design, and provided with passages $e$ leading thereto, combined with the removable core to fill the interior of the mold.

2. The two-part mold cut in intaglio and the core to fill the mold, combined with the font connected therewith and the plunger to force the glass from the font into the intaglio, substantially as described.

3. That improvement in the art or method of ornamenting in relief articles of glass which consists in filling the intaglio made at the interior of the mold with a glass or equivalent compound of the desired kind and color while the core is within the mold, then removing the core and shaping by blowing or pressing the body of the article of glass in the said mold, causing it to firmly adhere to the ornamental parts of the glass, yet held at the interior of the mold.

In testimony whereof I have signed my name to this specification in the presence of two subscribing witnesses.

WILLIAM L. LIBBEY.

Witnesses:
JOS. P. LIVERMORE,
N. E. C. WHITNEY.